US008380386B2

(12) United States Patent
Gomiero et al.

(10) Patent No.: US 8,380,386 B2
(45) Date of Patent: Feb. 19, 2013

(54) TESTING DEVICE AND METHOD FOR CHECKING THE OPERABILITY OF A NOISE WHEEL STEERING CONTROL UNIT IN AN AIRCRAFT

(75) Inventors: Daniel Gomiero, Daux (FR); Roger Morvan, Gratentour (FR)

(73) Assignee: Airbus Operations SAS, Toulouse (FR)

( * ) Notice: Subject to any disclaimer, the term of this patent is extended or adjusted under 35 U.S.C. 154(b) by 300 days.

(21) Appl. No.: 12/745,488

(22) PCT Filed: Nov. 29, 2007

(86) PCT No.: PCT/EP2007/010381
§ 371 (c)(1),
(2), (4) Date: Oct. 22, 2010

(87) PCT Pub. No.: WO2009/068067
PCT Pub. Date: Jun. 4, 2009

(65) Prior Publication Data
US 2011/0029183 A1 Feb. 3, 2011

(51) Int. Cl.
*G01M 17/00* (2006.01)
(52) U.S. Cl. .................................................. 701/29.1
(58) Field of Classification Search .................. None
See application file for complete search history.

(56) References Cited

U.S. PATENT DOCUMENTS

| 3,067,832 A | 12/1962 | Wohl |
| 3,885,759 A | 5/1975 | Lear |
| 4,646,255 A | 2/1987 | Ebert et al. |
| 4,782,292 A | 11/1988 | Gilfoy et al. |
| 5,260,874 A | 11/1993 | Berner et al. |

FOREIGN PATENT DOCUMENTS

| RU | 2 287 457 C1 | 11/2006 |
| WO | WO 2005/077754 A1 | 8/2005 |

OTHER PUBLICATIONS

International Search Report and Written Opinion, PCT/EP2007/010381, Airbus France S.A.S., The International Searching Authority/European Patent Office, Nov. 29, 2007.
English language abstract for RU 2 287 457 C1 Nov. 20, 2006.

*Primary Examiner* — Thomas Tarcza
*Assistant Examiner* — Adam Alharbi
(74) *Attorney, Agent, or Firm* — Krieg DeVault LLP

(57) ABSTRACT

The invention relates to a testing device (12) for checking the operability of a bow steer control unit (10) in an aircraft. The bow steer control unit has a plurality of input ports and a plurality of output ports, wherein at least one of the input ports of the bow steer control unit is connectable to a speed sensor, which provides a signal representing the actual speed of the bow wheel of the aircraft. The bow steer control unit outputs a blocking signal to be transmitted to a steering mechanism as soon as the detected actual speed of the bow wheel exceeds a predetermined bow wheel speed value. The testing device comprises a connection interface (14) to be connected to at least one input port of the bow steer control unit and a bow wheel speed simulating nit for generating a bow wheel speed simulation signal, which represents a particular simulated bow wheel speed value exceeding the predetermined speed value The generated bow wheel speed simulation signal is transmitted to the bow steer control unit via the connection interface. The output of the bow steer control unit in response to the received bow wheel speed simulation signal is then monitored.

24 Claims, 1 Drawing Sheet

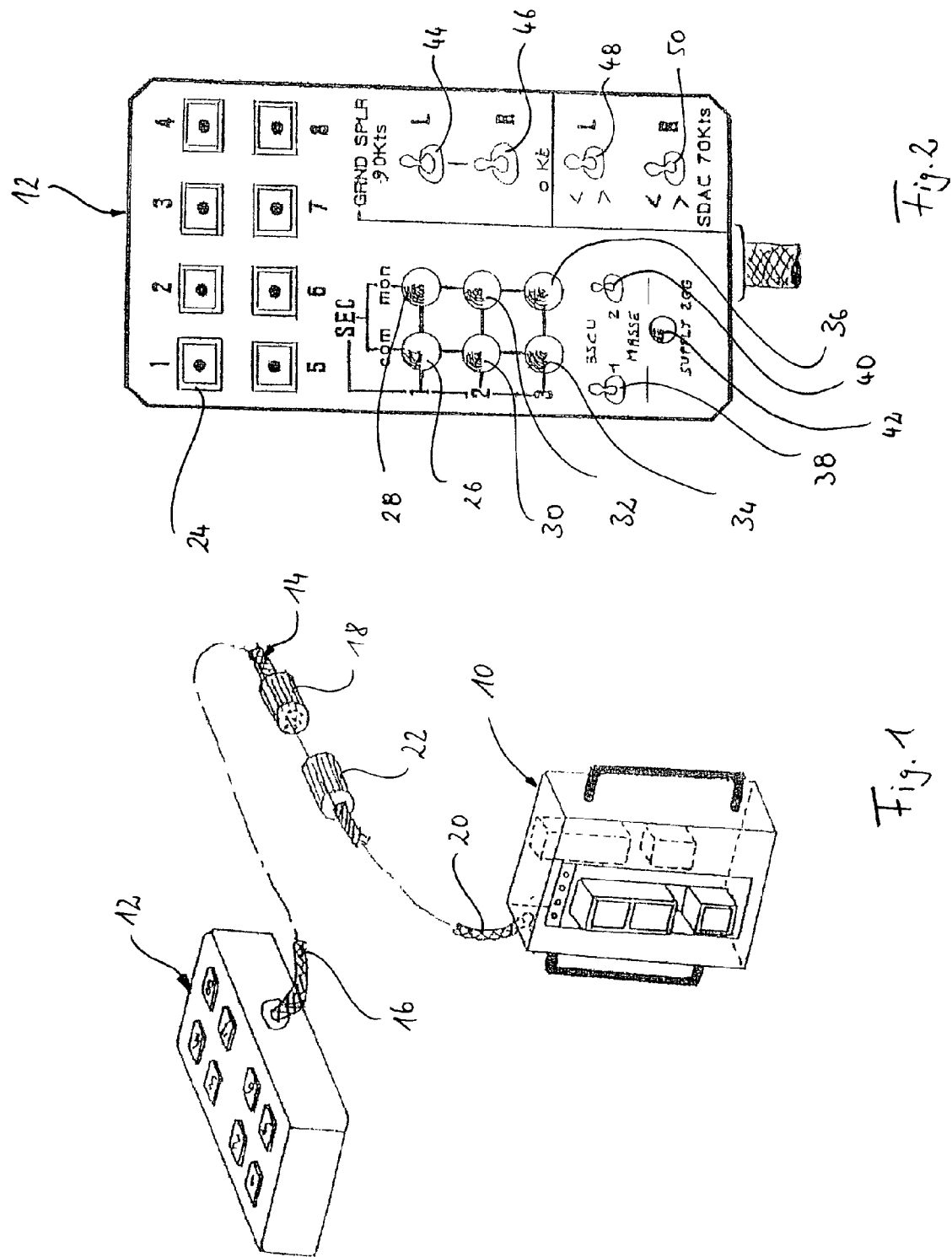

TESTING DEVICE AND METHOD FOR CHECKING THE OPERABILITY OF A NOISE WHEEL STEERING CONTROL UNIT IN AN AIRCRAFT

CROSS REFERENCE TO RELATED APPLICATIONS

The present application is a §371 national stage patent application of PCT/EP2007/010381, filed Nov. 29, 2007, which is incorporated herein by reference.

The present invention relates to a testing device and a corresponding method for checking the operability of a bow steer control unit in an aircraft.

In the field of aircraft, it is necessary to block the steering function of a front steering wheel arranged at the bow of the aircraft as soon as the aircraft runs on the ground with a certain velocity, e.g. above 70 knots. This means that the bow wheel (i.e. the front wheel) of the respective aircraft must be blocked against any steering movement, even if a respective signal from the cockpit is received by the steering mechanism. The control of the bow wheel steering is performed by a bow steer control unit. For safety reasons, modern aircrafts usually comprise two separate bow steer control units which are usually accommodated within common single housing. Both bow steer control units are adapted to control the steering of the bow wheel as well as to monitor the operation of the bow wheel steering. It is also known in the art to use both bow steer control units, synchronously, wherein one bow steer unit is in a command mode controlling the bow steering and the respective other bow steer control unit is in a monitoring mode monitoring the operation of the bow steering. After each flight, the command and monitoring responsibility of the two bow steer control units are changed, i.e. both bow steer control units are used alternately for monitoring and controlling.

It is also common practice to use a plurality of speed sensors in order to monitor the actual speed of the bow wheel. Each speed sensor, or at least a plurality of the bow wheel speed sensors, provided in the aircraft are connected to the bow steer control unit and transmit output signals thereto. Moreover, the bow steer control unit can also be connected to a plurality of further components of the aircraft, for example for controlling the ground spoiler, for controlling the slats and the aileron and for outputting certain operational states by optical indicators or the like.

In order to guarantee a high fail safety, the operability of the bow steer control units are to be checked in regular intervals. It is the object of the present invention to provide a testing device and a corresponding method for checking the operability of a bow steer control unit in an aircraft in an easy and time saving manner.

This object is solved by a testing device for checking the operability of a bow steer control unit in an aircraft, wherein the bow steer control unit has a plurality of input ports and a plurality of output ports, wherein at least one of the input ports of the bow steer control unit is connectable to a speed sensor, which provides a signal representing the actual speed of the bow wheel of the aircraft, and wherein the bow steer control unit outputs a blocking signal to be transmitted to a steering mechanism as soon as the detected actual speed of the bow wheel exceeds a predetermined bow wheel speed value. The testing device comprises a connection interface to be connected to at least one input port of the bow steer control unit and a bow wheel speed simulating unit for generating a bow wheel speed simulation signal, which represents a particular simulated bow wheel speed value exceeding the predetermined speed value, wherein the generated bow wheel speed simulation signal is transmitted to the bow steer control unit via the connection interface and wherein the output of the bow steer control unit in response to the received bow wheel speed simulation signal is monitored.

The testing device can be easily connected to the bow steer control unit by connecting the connection interface of the testing device to the respective input and output ports of the bow steer control unit. Preferably, respective plug connectors are provided. Thereafter, certain test procedures can be performed manually or automatically by using the testing device.

It may be necessary to dismount from the bow steer control unit the aircraft in order to connect the connection interface of the testing device according to the invention to the respective input and output ports of the bow steer control unit, e.g. via the plug connectors.

According to one embodiment of the invention, the bow steer control unit comprises a plurality of speed sensor input ports each connectable to a separate speed sensor and wherein the connection interface comprises corresponding simulated speed signal output ports to be connected to the speed sensor input ports of the bow steer control unit. Thereby, the function of all speed sensors and the interaction between these speed sensors and the bow steer control unit can be tested. It is possible to check the interaction between the bow steer control unit and each of the speed sensors, separately, by deactivating the connection between all speed sensors and the bow steer control unit and by sending a simulated speed sensor signal from the testing device to the bow steer control unit. The reaction of the bow steer control unit in response to the received simulated speed sensor signal is then monitored.

The bow steer control unit according to the invention may comprise at least one, preferably two, bow wheel speed simulation signal generators for generating an AC voltage signal, in particular in a frequency range around 2600 Hz. Such an AC voltage signal usually corresponds to a velocity of 90 knots. Usually, the predetermined bow wheel speed value, which is relevant for blocking the steering function of the bow wheel, is in the range of 70 knots. By using of two bow wheel speed simulation signal generators, which are preferably sinus generators, the fail safety of the testing device according to the invention can be improved.

In order to facilitate the use of the testing device according to the invention, the connection interface may further include a voltage supply port to be connected to a voltage output of the bow steer control unit. Thereby, there is no additional, i.e. external, voltage supply necessary.

In a further embodiment, the testing device may comprise a supply indicator, in particular an optical supply indicator, for indicating an appropriate voltage supply. Moreover, it is possible according to the invention that the testing device further comprises a manual user interface for a manual activation of testing functions of the testing device. Thus, as already indicated above, it is possible to perform predetermined testing procedures automatically or to check the operability of the bow steer control unit and further components of the aircraft connected thereto manually.

As already discussed in the introductory part, usually airports provide simulation systems for the aircrafts. Considering this, according to one embodiment of the invention the connection interface includes connection ports to be connected to an external simulation system, in particular to an airport operation system, providing predetermined simulation procedures based on airport related parameters for simulating certain operation scenarios.

According to a further embodiment of the invention the connection interface further comprises at least one input port to be connected to a corresponding output port of the bow steer control unit for checking the correctness of the output signal provided by the bow steer control unit in response to the bow wheel speed simulation signal. This output can include an optical or acoustical indication.

According to a further embodiment of the invention, the connection interface further comprises at least one output port to be connected to a further external component interacting with the bow steer control unit wherein the bow steer control unit provides a simulated output signal for checking the operability of external component. This function is may be required, as a plurality of external components in the aircraft are fed with signals from the bow steer control unit and controlled based thereupon.

One example for such an external component is the ground spoiler control unit. Thus, according to one embodiment of the invention of the output ports of the connection interface is adapted to be connected to a ground spoiler control unit for checking whether the ground spoiler control unit drives a ground spoiler, when the received signal indicates that the bow wheel speed has exceeded the predetermined speed value. Considering this, it is possible according to the invention that the connection interface includes an output port for the left wing ground spoiler control unit and a further output port for the right wing ground spoiler control unit, respectively.

In addition or as an alternative to a connection to the ground spoiler control unit, it is also possible according to the invention, that one of the output ports of the connection interface is adapted to be connected to an aircraft data monitoring device for checking whether the aircraft data monitoring device processes and indicates the received simulated data, appropriately.

Moreover, it is possible that one of the output ports of the connection interface is adapted to be connected to slat aileron control device for checking whether the slat aileron control device controls the slats and/or the aileron appropriately after the predetermined speed value has been exceeded by the bow wheel speed simulation signal. Considering this, it is also possible that the connection interface includes two sets of output ports, each separately connectable to one of two separate slat aileron control devices provided in the aircraft, wherein the testing device is arranged to operate the two separate slat aileron control devices, synchronously, such that one of the slat aileron control devices operates in an activated command mode, when the respective other slat aileron control device operates in a monitoring mode.

As already indicated in the introductory part, it is common practice to provide an aircraft with two separate bow steer control units. Considering this measure for increasing the fail safety, a further embodiment according to the present invention provides that the connection interface includes two sets of output ports each separately connectable to one of two separate bow steer control units provided in the aircraft, wherein the testing device is adapted to operate and test the two separate bow steer control units, synchronously, such that one of the bow steer control units operates in an activated command mode, when the respective other bow steer control unit operates in an monitoring mode, and vice versa.

The object of the present invention is also achieved by a method for checking the operability of a bow steer control unit in an aircraft, wherein the bow steer control unit has a plurality of input ports and a plurality of output ports, wherein at least one of the input ports of the bow steer control unit is connectable to a speed sensor which provides a signal representing the actual speed of the bow wheel of the aircraft and wherein the bow steer control unit outputs a blocking signal to be transmitted to a steering mechanism as soon as the detected actual speed of the bow wheel exceeds a predetermined bow wheel speed value. The method comprises the steps of connecting a connection interface of a testing device, as described above, to at least one input port of the bow steer control unit, generating a bow wheel speed simulation signal, which represents a particular simulated bow wheel speed value exceeding the predetermined speed value, transmitting the generated bow wheel speed simulation signal to the bow steer control unit via the connection interface and monitoring the output of the bow steer control unit in response to the received bow wheel speed simulation signal.

Thus, by applying the method according to the invention, it can be checked whether the bow wheel indeed is blocked, when the bow wheel speed simulation signal exceeds the predetermined speed value.

The method according to the present invention may further comprise the steps of connecting the testing device to an external simulation system, in particular an airport operation system, which provides predetermined simulation procedures, and simulating certain operation scenarios based on the predetermined simulation procedures.

Moreover, the method according to the invention may further comprise the steps of connecting the testing device to a corresponding output port of the bow steer control unit and checking the correctness of the output signal provided by the bow steer control unit in response to the bow wheel speed simulation signal.

As already discussed above in view of the testing device, the method according to the invention may further comprise the steps of connecting the testing device to a further external component controlled by the bow steer control unit and providing a simulated output signal, which is transmitted to the external component, for checking the operability of external component.

In addition or in alternative to that, the method according to the invention may further comprise the steps of connecting the testing device to a ground spoiler control unit and checking whether the ground spoiler control unit activates a ground spoiler after the predetermined speed value has been exceeded by the bow wheel speed simulation signal.

Furthermore, the method according to the invention may comprise the steps of connecting the testing device to an aircraft data monitoring device and checking whether the aircraft data monitoring device processes and indicates the received simulated data, appropriately.

According to a further embodiment, the method according to the invention may comprise the steps of connecting the testing device to a slat aileron control device and checking whether the slat aileron control device controls the slats and the aileron appropriately, after the predetermined speed value has been exceeded by the bow wheel speed simulation signal. Additionally, the method according to the invention may further comprise the steps of connecting the testing device to two separate slat aileron control devices provided in the aircraft and operating the two separate slat aileron control devices, synchronously, by using the testing device such that one of the slat aileron control devices operates in an activated command mode, when the respective other slat aileron control device operates in an monitoring mode, and vice versa.

Finally, as already indicated above, the method according to the invention may comprise the steps of connecting the testing device to one of two separate bow steer control units provided in the aircraft and operating the two separate bow steer control units, synchronously, by using the testing device such that one of the bow steer control units operates in an activated command mode, when the respective other bow steer control unit operates in an monitoring mode, and vice versa.

A preferred embodiment of a testing device according to the present invention will now be explained in more detail with reference to the accompanying drawings, in which:

FIG. 1 shows a perspective schematic view of a testing device according to the invention connected to a bow steer control unit and FIG. 2 shows a top plan view of an embodiment of the manual user interface of the testing device according to the invention.

FIG. 1 shows a bow steer control unit 10 and a testing device 12 according to the invention, which are connected to each other by means of a connection cable arrangement 14. The connection cable arrangement 14 includes two parts. A first part 16 is connected to the testing device and has a female plug connector 18. A second part 20 of the connecting cable 14 is connected to the bow steer control unit 10 and includes a corresponding male plug connector 22. The plug connectors 18 and 22 include terminals associated to input and output ports of both the bow steer control unit 10 and the testing device 12. It also includes power supply terminals for supplying power voltage to the testing device 12.

FIG. 2 shows a top plan view of the user interface of the testing device 12. The user interface includes in its upper third eight buttons 24-1, 24-2, 24-3, 24-4, 24-5, 24-6, 24-7 and 24-8. With these eight buttons it is possible to activate a simulation of one of eight speed sensors provided to detect the wheel speed of the bow steering wheel of an aircraft. For example by pressing button 24-1, the first speed sensor associated to the bow steering wheel of the aircraft is simulated whereas the other seven speed sensors are not simulated and deactivated. Thus, it is possible to provide a simulateted output signal generated by the testing device 12 and to transmit it via the cable 14 to the bow steer control unit 10 in order to check the operability of the bow steer control unit 10, in particular the response to the generated simulated speed sensor output signal of the testing device 12.

The testing device 12 moreover includes in the middle part on the left side of FIG. 2 optical indicators 26, 28, 30, 32, 34, 36. These optical indicators 26, 28, 30, 32, 34, 36 are used for showing, whether certain control units which are provided twice in the aircraft, are currently working in a command mode or in a monitoring mode. The indicators 26 to 36 particularly indicate which of the Slat Aileron Control Units (SEC) are currently working in a command mode or a monitoring mode. The testing device also simulates a signal (valet signal) for the Flight Management Computers (FMGC). This is due to the fact that in order to improve the fail safety, modern aircrafts usually comprise certain control units twice. When the first control unit works in the command mode, the second control unit having the same functions operates in the monitoring mode and monitors the operation of the control system. After each flight, for example, the tasks are interchanged with each other and the control unit having monitored the operation of the system then commands the respective system and the control unit having commanded the system then monitors the system. Thus, there is a predetermined order of operation, which also has to be checked with the testing device. This can be done by means of the indicators 28 to 36. By using the switches 38, 40, certain control units can be activated or deactivated. Moreover, there is a further optical indicator 42 for indicating, whether the power supply to the testing device is sufficient or not.

The testing device 12 is adapted to perform the testing function automatically by executing a predetermined routine, such that a operating person simply has to monitor, whether the output signals confirm the correct functioning of the tested bow steer control unit or not. However, the testing device 12 also provides two switches 44 and 46 for checking the interaction between the bow steer control unit 10 and a ground spoiler control unit manually. By activating switch 44 it is possible to check whether the ground spoiler control unit correctly responds to a signal coming from the bow steer control unit, e.g. by activating the ground spoiler on the left side. The same applies for switch 46, which is provided for a manual activation of the ground spoiler control unit for controlling the ground spoiler on the right side.

The two switches 48 and 50 have a similar function. They are associated to an aircraft data monitoring device, e.g. a system data acquisition computer (SDAC). This aircraft data monitoring device outputs a certain signal, for example an optical signal, in the cockpit of the aircraft, as soon as the speed limit of 70 knots has been exceeded by the bow wheel of the aircraft. As soon as this predetermined bow wheel speed value has been exceeded, the bow steering is to be blocked in order to avoid an accident. For checking, whether the aircraft data monitoring device (SDAC) correctly recognizes an excess of this predetermined bow wheel speed value, one of the two switches 48 and 50 are to be switched on. Thereupon, a corresponding simulated signal is generated by the testing device 12 and transmitted to the aircraft data monitoring device. Thereupon it is checked, whether the aircraft data monitoring device reacts appropriately or not.

Summarizing the application and the use of the testing device 12, it is to be stated that it is easily connectable to the bow steer control unit 10 and that it facilitates to check the operability of certain functions directly implemented in the bow steer control unit 10 or initiated thereby, for example by outputting certain control signals.

The invention claimed is:

1. A testing device for checking the operability of a nose wheel steering control unit in an aircraft, wherein the nose wheel steering control unit has a plurality of input ports and a plurality of output ports, wherein at least one of the input ports of the nose wheel steering control unit is connectable to a speed sensor, which provides a signal representing the actual speed of the nose wheel of the aircraft, and wherein the nose wheel steering control unit outputs a blocking signal to be transmitted to a steering mechanism as soon as the detected actual speed of the nose wheel exceeds a predetermined nose wheel speed value, the testing device comprising:

a connection interface to be connected to at least one input port of the nose wheel steering control unit and a nose wheel speed simulating unit for generating a nose wheel speed simulation signal which represents a particular simulated nose wheel speed value exceeding the predetermined speed value, wherein the generated nose wheel speed simulation signal is transmitted to the nose wheel steering control unit via the connection interface and wherein the output of the nose wheel steering control unit in response to the received nose wheel speed simulation signal is monitored.

2. The testing device according to claim 1, wherein the nose wheel steering control unit comprises a plurality of speed sensor input ports each connectable to separate speed sensors and wherein the connection interface comprises corresponding simulated speed signal output ports to be connected to the speed sensor input ports of the nose wheel steering control unit.

3. The testing device according to claim 1, further comprising at least one, preferably two, nose wheel speed simulation signal generators for generating an AC voltage signal, in particular in a frequency range of around 2600 Hz.

4. The testing device according to claim 1, wherein the connection interface includes a voltage supply port to be connected to a voltage output of the nose wheel steering control unit.

5. The testing device according to claim 1, further comprising a supply indicator, in particular an optical supply indicator, for indicating an appropriate voltage supply.

6. The testing device according to claim 1, further comprising a manual user interface for a manual activation of testing functions of the testing device.

7. The testing device according to claim 1, wherein the connection interface includes connection ports to be connected to an external simulation system, in particular an airport operation system, providing predetermined simulation procedures for simulating certain operation scenarios.

8. The testing device according to claim 1, wherein the connection interface further comprises at least one input port to be connected to a corresponding output port of the nose wheel steering control unit for checking the correctness of the output signal provided by the nose wheel steering control unit in response to the nose wheel speed simulation signal.

9. The testing device according to claim 1, wherein the connection interface further comprises at least one output port to be connected to a further external component controlled by the nose wheel steering control unit, wherein the nose wheel steering control unit provides a simulated output signal for checking the operability of external component.

10. The testing device according to claim 9, wherein one of the output ports of the connection interface is adapted to be connected to a ground spoiler control unit for checking whether the ground spoiler control unit activates a ground spoiler after having exceeded the predetermined speed value.

11. The testing device according to claim 9, wherein the connection interface includes an output port for the left wing ground spoiler control unit and an output port for the right wing ground spoiler control unit, respectively.

12. The testing device according to claim 9, wherein one of the output ports of the connection interface is adapted to be connected to an aircraft data monitoring device for checking whether the aircraft data monitoring device processes and indicates the received simulated data appropriately.

13. The testing device according to claim 9, wherein one of the output ports of the connection interface is adapted to be connected to slat aileron control device for checking whether the slat aileron control device controls the slats and the aileron appropriately, after the predetermined speed value has been exceeded by the nose wheel speed simulation signal.

14. The testing device according to claim 13, wherein the connection interface includes two sets of output ports, each separately connectable to one of two separate slat aileron control devices provided in the aircraft, wherein the testing device is arranged to operate the two separate slat aileron control devices, synchronously, such that one of the slat aileron control devices operates in an activated command mode, when the respective other slat aileron control devices operates in an monitoring mode.

15. The testing device according to claim 1, wherein the connection interface includes two sets of output ports each separately connectable to one of two separate nose wheel steering control units provided in the aircraft, wherein the testing device is adapted to operate the two separate nose wheel steering control units, synchronously, such that one of the nose wheel steering control units operates in an activated command mode, when the respective other nose wheel steering control unit operates in an monitoring mode.

16. A method for checking the operability of a nose wheel steering control unit in an aircraft, wherein the nose wheel steering control unit has a plurality of input ports and a plurality of output ports, wherein at least one of the input ports of the nose wheel steering control unit (10) is connectable to a speed sensor which provides a signal representing the actual speed of the nose wheel of the aircraft and wherein the nose wheel steering control unit outputs a blocking signal to be transmitted to a steering mechanism as soon as the detected actual speed of the nose wheel exceeds a predetermined nose wheel speed value, the method comprising the steps of:
 connecting a connection interface of a testing device according to one of the preceding claims to at least one input port of the nose wheel steering control unit,
 generating a nose wheel speed simulation signal which represents a particular simulated nose wheel speed value exceeding the predetermined speed value,
 transmitting the generated nose wheel speed simulation signal to the nose wheel steering control unit via the connection interface and
 monitoring the output of the nose wheel steering control unit in response to the received nose wheel speed simulation signal.

17. The method according to claim 16, further comprising the steps of connecting the testing device to an external simulation system, in particular an airport operation system, which provides predetermined simulation procedures, and simulating certain operation scenarios based on the predetermined simulation procedures.

18. The method according to claim 16, further comprising the steps of connecting the testing device to a corresponding output port of the nose wheel steering control unit and checking the correctness of the output signal provided by the nose wheel steering control unit in response to the nose wheel speed simulation signal.

19. The method according to claim 16, further comprising the steps of connecting the testing device to a further external component controlled by the nose wheel steering control unit and providing a simulated output signal, which is transmitted to the external component, for checking the operability of external component.

20. The method according to claim 16, further comprising the steps of connecting the testing device to a ground spoiler control unit and checking whether the ground spoiler control unit activates a ground spoiler after the predetermined speed value has been exceeded by the nose wheel speed simulation signal.

21. The method according to claim 16, further comprising the steps of connecting the testing device to an aircraft data monitoring device and checking whether the aircraft data monitoring device processes and indicates the received simulated data appropriately.

22. The method according to claim 16, further comprising the steps of connecting the testing device to a slat aileron control device and checking whether the slat aileron control device controls the slats and the aileron appropriately after the predetermined speed value has been exceeded by the nose wheel speed simulation signal.

23. The method according to claim 22, further comprising the steps of connecting the testing device to two separate slat aileron control devices provided in the aircraft and operating the two separate slat aileron control devices, synchronously, by using the testing device such that one of the slat aileron control devices operates in an activated command mode when the respective other slat aileron control devices operates in an monitoring mode.

24. The method according to claim 16, further comprising the steps of connecting the testing device to one of two separate nose wheel steering control units provided in the aircraft and operating the two separate nose wheel steering control units, synchronously, by using the testing device such that one of the nose wheel steering control units operates in an activated command mode when the respective other nose wheel steering control unit operates in an monitoring mode.

* * * * *

UNITED STATES PATENT AND TRADEMARK OFFICE
CERTIFICATE OF CORRECTION

PATENT NO. : 8,380,386 B2  
APPLICATION NO. : 12/745488  
DATED : February 19, 2013  
INVENTOR(S) : Daniel Gomiero et al.

Page 1 of 1

It is certified that error appears in the above-identified patent and that said Letters Patent is hereby corrected as shown below:

On the Title Page, Item (54), and in the Specification, column 1, please replace in line 2 of the title "[noise]" with --nose--.

Signed and Sealed this  
Twenty-eighth Day of January, 2014

Michelle K. Lee  
*Deputy Director of the United States Patent and Trademark Office*